United States Patent
Shiina

(10) Patent No.: US 7,895,356 B2
(45) Date of Patent: Feb. 22, 2011

(54) IP ROUTER, COMMUNICATION SYSTEM AND BAND SETTING METHOD USED THEREIN AND ITS PROGRAM

(75) Inventor: Misao Shiina, Tokyo (JP)

(73) Assignee: NEC Infrontia Corporation, Kanagawa (JP)

( * ) Notice: Subject to any disclaimer, the term of this patent is extended or adjusted under 35 U.S.C. 154(b) by 1763 days.

(21) Appl. No.: 10/748,162

(22) Filed: Dec. 31, 2003

(65) Prior Publication Data

US 2004/0172470 A1     Sep. 2, 2004

(30) Foreign Application Priority Data

Jan. 8, 2003    (JP)   ............................. 2003-001640

(51) Int. Cl.
    G06F 15/173    (2006.01)
(52) U.S. Cl. .................. 709/238; 709/240; 709/242; 709/244
(58) Field of Classification Search .......... 709/238, 709/240, 242, 244
    See application file for complete search history.

(56) References Cited

U.S. PATENT DOCUMENTS

| | | | | |
|---|---|---|---|---|
| 6,205,146 | B1 * | 3/2001 | Rochberger et al. ..... | 370/395.53 |
| 6,411,986 | B1 * | 6/2002 | Susai et al. .................. | 709/203 |
| 6,598,077 | B2 * | 7/2003 | Primak et al. ............... | 709/219 |
| 6,795,858 | B1 * | 9/2004 | Jain et al. .................... | 709/226 |
| 2002/0105911 | A1 * | 8/2002 | Pruthi et al. ................ | 370/241 |
| 2003/0101278 | A1 * | 5/2003 | Garcia-Luna-Aceves et al. ........................... | 709/240 |
| 2003/0149755 | A1 * | 8/2003 | Sadot ......................... | 709/223 |

FOREIGN PATENT DOCUMENTS

| | | |
|---|---|---|
| CN | 1332924 A | 1/2002 |
| JP | 9-218842 A | 8/1997 |
| JP | 10-198642 A | 7/1998 |
| JP | 10-307783 A | 11/1998 |
| JP | 10-312365 A | 11/1998 |
| JP | 2000-10936 A | 1/2000 |
| JP | 2000-311130 A | 11/2000 |
| JP | 2001-24699 A | 1/2001 |
| JP | 2001-331398 A | 11/2001 |

OTHER PUBLICATIONS

Lachhiramka, B.K., Barua, G., "Switch Based Traffic Distribution for Web Server Farms".Eigth National Conference on Communications at Indian Institute of Technology Bombay. Jan. 25, 2002 [retrieved from Internet, Google ACM www.ee.iitb.ac.in/uma/~ncc2002/proc/NCC-2002/pdf/no52.pdf].*

(Continued)

Primary Examiner—Philip J Chea
Assistant Examiner—Lashanya R Nash
(74) Attorney, Agent, or Firm—Sughrue Mion, PLLC

(57) ABSTRACT

A server monitoring function unit recognizes a running/stopping state of each server, throughput and the like by performing a health check based on obtained positioning information of an original server and mirror servers, informs an optimum server selecting function unit of the information, and updates a server URL list based on the positioning information. When the server monitoring function unit detects a change in the network topology from a change in an IP routing table, the optimum server selecting function unit alters the selection criteria of the optimum server and informs a QoS controlling unit of a traffic change. The QoS controlling unit alters a band setting for each service class according to the traffic change informed.

18 Claims, 9 Drawing Sheets

OTHER PUBLICATIONS

Garcia-Luna-Aceves, J.J.; Shree Murthy;"A path-finding algorithm for loop-free routing", Networking, IEEE/ACM Transactions on vol. 5, Issue: 1 Publication Year: 1997, pp. 148-160 [retrieved from IEEE on Apr. 21, 2010].*

Seshan, S., Stemm, M., and Katz, R. H. Spand: Shared Passive Network Performance Discovery. In Proc. 1st USITS (Monterey, CA, Dec. 1997), pp. 135-146. [retrieved from ACM database on Nov. 4, 2010].*

Ellen W. Zegura, Mostafa H. Ammar, Zongming Fei, Samrat Bhattacharjee, Application-layer anycasting: a server selection architecture and use in a replicated Web service, IEEE/ACM Transactions on Networking (TON), v.8 n.4, p. 455-466, Aug. 2000. [retrieved from ACM datase on Nov. 4, 2010].*

* cited by examiner

IP ROUTER, COMMUNICATION SYSTEM AND BAND SETTING METHOD USED THEREIN AND ITS PROGRAM

BACKGROUND

The present invention relates to an IP router, a communication system and a band setting method used therein and its program, and in particular, to a method for controlling traffic changed by a selection of a mirror server in the Internet.

In the Internet, in order to prevent services, to be provided by a server for providing contents or programs, from being halted even when the server is down, there may be a case that the contents or programs to be provided by the server are always synchronized, and backup servers for substituting the server, when failed, are provided, conventionally.

When a content is provided by a server, or a program is downloaded from a server, it causes a load to the server if the provision or the download is performed by only one server, and also it is inefficient. Considering this fact, there may be a case that a plurality of servers, capable of providing or accommodating download of the same contents or programs, are provided.

In this case, the originating server is called an original server, and servers, synchronizing the contents or programs which can be provided by or downloaded from the original server, are called mirror servers. In the case of a plurality of mirror servers being provided as described above, an optimum server selecting device, for selecting the optimum server among a plurality of mirror servers appropriate for a request (content, program or the like) from a client, may be equipped (see, for example, the Japanese Patent Application Laid-open No. 10-312365, the Japanese Patent Application Laid-open No. 2001-331398).

In the conventional Internet aforementioned, in the case that the optimum server selecting device is equipped for selecting from a plurality of mirror servers, the optimum server selecting device is a device independent of other devices, so that there is no means that the optimum server selecting device recognizes changes in the network topology.

In order to select the optimum server even when there is any change in the network topology, a health check, for obtaining information about a running/stopping state, RTT (Round-Trip Time), throughput or the like for each server which can be an index for selecting the optimum server, must be regularly performed to thereby make the check result reflected in the selection criteria.

However, if the health check is regularly performed, there arises a problem that traffic caused by the health check presses the network. Further, even though the optimum server selecting device is capable of recognizing changes in the network topology and, with an alteration of the selection criteria of the optimum server corresponding to the changes, the traffic is changed and accordingly the required band for each route is changed, routing processing can not immediately accommodate the change.

SUMMARY OF THE INVENTION

It is therefore an object of the present invention to provide an IP router, a communication system and a band setting method and an optimum server selecting method used therein, and their programs, which are capable of solving the aforementioned problems, altering band settings in a dynamic manner, and immediately performing routing processing corresponding to traffic changes accompanying alterations of the selection criteria of the optimum server when the network topology is changed.

In order to achieve the object, an IP router of the present invention includes an IP (Internet Protocol) routing table for storing routing information for connecting a plurality of client devices with an original server which is at least an origin of supplying a content and with a plurality of mirror servers into which the content supplied from the original server is copied. The IP router comprises: a means for ending a connection relating to a packet output from a specific port of the client device, and obtaining request information of a content requested by the client device; a means for selecting a server optimum for the request information based on information which is to be an index for selecting the optimum server if the obtained request information corresponds to a plurality of mirror servers, and based on the routing information; a means for obtaining the content by connecting with the selected optimum server; and a means for transferring the obtained content to the client device.

The IP router according to the present invention ends a connection relating to a packet output from a specific port of the client device, and obtains request information of a content requested by the client device.

Then, the IP router selects a server optimum for the request information based on information which is to be an index for selecting the optimum server if the obtained request information corresponds to a plurality of mirror servers, and based on the routing information.

Then, the IP router obtains the content by connecting with the selected optimum server, and transfers the obtained content to the client device.

Therefore, according to the present invention, it is possible to realize an IP router has a function of selecting the optimum server following the changes in the network topology and in the traffic, and a function of altering a required band for each route corresponding to the traffic changes accompanying the alteration of the selection criteria of the optimum server when the network topology is changed.

The IP router of the present invention may comprise: a means for detecting, from a change in contents of the IP routing table, that a network topology has been changed; a means for altering the selection criteria of the optimum server based on the result of detecting that the network topology has been changed; and a means for altering a band setting for each service class corresponding to a traffic change accompanying an alteration of the selection criteria.

A communication system of the present invention comprises: a plurality of client devices; an original server which serves as at least an origin of supplying a content; a plurality of mirror servers which copy and hold the content supplied from the original server; and an IP (Internet Protocol) router for connecting a plurality of client devices with the original server and a plurality of mirror servers over a network.

The IP router includes an IP (Internet Protocol) routing table for storing routing information, and comprises: a means for ending a connection relating to a packet output from a specific port of the client device and obtaining request information of a content requested by the client device; a means for selecting a server optimum for the request information based on information which is to be an index for selecting the optimum server if the obtained request information corresponds to a plurality of mirror servers, and based on the routing information; and a means for obtaining the content by connecting with the selected optimum server.

A band setting method of the present invention is a band setting method of an IP router for setting a band when connecting a plurality of client devices with an original server which at least serves as an origin of supplying a content and with a plurality of mirror servers which copy and hold the content over a network based on routing information of a routing table provided in an IP (Internet Protocol) router.

The band setting method comprises the steps of: ending a connection relating to a packet output from a specific port of the client device, and obtaining request information of a content requested by the client device; selecting a server optimum for the request information based on information which is to be an index for selecting the optimum server if the obtained request information corresponds to a plurality of mirror servers, and based on the routing information; obtaining the content by connecting with the selected optimum server; transferring the obtained content to the client device; detecting, from a change in contents of the IP routing table, that a network topology has been changed; altering a selection criteria of the optimum server based on the result of detecting that the network topology has been changed; and altering a band setting for each service class corresponding to a traffic change accompanying an alteration of the selection criteria.

A program of the present invention is a program for setting a band by an IP (Internet Protocol) router which sets a band when connecting a plurality of client devices with an original server which at least serves as an origin of supplying a content and with a plurality of mirror servers which copy and hold the content over a network based on routing information of a routing table provided in an IP (Internet Protocol) router.

The program is configured as an electric signal for causing a computer of the IP router to execute: a process of ending a connection relating to a packet output from a specific port of the client device, and obtaining request information of a content requested by the client device; a process of selecting an optimum server for the request information based on information which is to be an index for selecting an optimum server if the obtained request information corresponds to a plurality of mirror servers, and based on the routing information; a process of obtaining the content by connecting with the selected optimum server; and a process of transferring the obtained content to the client device.

Accordingly, the IP router of the present invention has, in addition to a routing function by an IP (Internet Protocol) address, a function of ending a connection with a client relating to a packet with a specific port number set by an operator and obtaining request information such as URL (Uniform Resource Locator), a function of selecting a server optimum for a request taking RTT (Round-Trip Time) or the like into account if the obtained request information such as URL corresponds to a plurality of mirror servers, a function of obtaining a content by connecting with the optimum server, a function of transferring the obtained content to the client, and a function of recognizing a change in the network topology by a change in the IP routing table and considers these changes when selecting the optimum server. The routing function includes a QoS (Quality of Service) controlling unit for altering a band setting for each route corresponding to the traffic change caused by the alteration of the selection criteria of the optimum server.

With these functions, the IP router of the present invention realizes, an operation of IP routing of a data packet between an IP router and a connected client and server network belongs to an optimum server selecting device, and an operation of selecting the optimum server when a request for supplying a content is output from a client to a server having a mirror server, which operations are in the conventional technique, in one device. In addition, the IP router of the present invention realizes a selection of the optimum server with a function of monitoring dynamic changes in the whole network, and alters a band setting for each route corresponding to a traffic change caused by an alteration of the optimum server selection.

Accordingly, it is possible to realize an IP router having a function of selecting the optimum server following the changes in the network topology and in the traffic, and a function of altering a required band for each route corresponding to a traffic change accompanying an alteration of the selection criteria of the optimum server when the network topology is changed.

More specifically, the IP router of the present invention locates on the side of clients, viewed from the network, and connects to the original server and the mirror servers over a network. When a request for obtaining a content is output from the client to the original server, conventionally, a connection is established between the client and the original server and the content is distributed.

In contrast, in a case of using the IP router of the present invention, a connection is established between the client and the IP router, and the IP router obtains a URL from the client. The IP router confirms whether mirror servers of the original sever corresponding to the obtained URL exists, and if they exist, selects the optimum server based on an index such as throughput or the like among the mirror servers and connects with it, and obtains the content from the server and transfers it to the client.

In the IP router of the present invention, it is noted that a change in the network topology can be recognized from a change in the IP routing table provided in the IP router. Therefore, by incorporating the optimum server selecting function in the IP router, the present invention is intended to add a function of referring to the IP routing table, to make it possible to recognize a change in the network topology automatically at the real time, to realize reflection to the selection index for the optimum server, and to alter a band setting for each route corresponding to the reflection to the selection index.

Further, when an IP router and an optimum server selecting device are used in combination, there are many problems that, for example, lowering of communication efficiency by a connection is not avoidable, so that it is difficult to improve performance. Further, it is also difficult to miniaturize or lower the cost in total. In the IP router of the present invention, an optimum server selecting function and an IP routing function, which are effective and exhibit high-performance, can be realized by integrating them.

PREFERRED EMBODIMENT OF THE PRESENT INVENTION

Next, embodiments of the present invention will be described with reference to the drawings.

Figure 1:
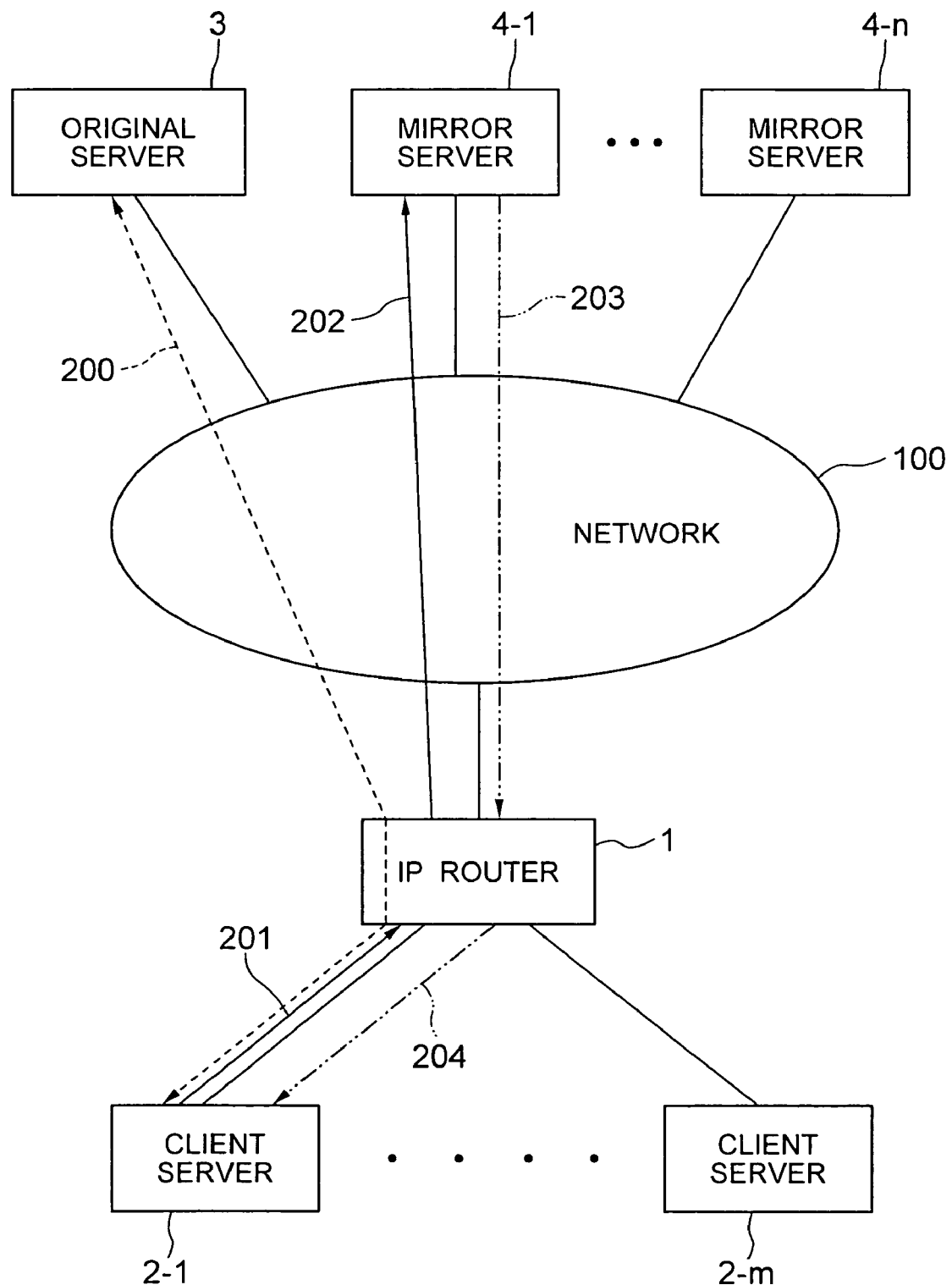
FIG. 1 is a block diagram showing the structure of a communication system according to a first embodiment of the present invention.

FIG. 1 is a block diagram showing the structure of a communication system according to a first embodiment of the present invention. In FIG. 1, the communication system according to the first embodiment of the present invention includes an IP (Internet Protocol) router 1 having an optimum server selecting function, client devices 2-1 to 2-*m* (m is a positive integer), an original server 3 from which contents or programs are provided, mirror servers 4-1 to 4-*n* (n is a positive integer) which copy and hold the contents provided from the original server 3, and a network 100 for connecting the IP router 1, the original server 3 and the mirror servers 4-1 to 4-*n* one another.

A communication image of the communication system, in particular, a communication image of the IP router 1 and a positioning of the IP router 1 in the network, according to the first embodiment of the present invention, will be described with reference to FIG. 1.

The IP router 1 is located on the side of the client devices 2-1 to 2-*m*, viewed from the network 100, and the original server 3 and the mirror servers 4-1 to 4-*n* are connected each other over the network 100.

In the conventional router technique, when a request for obtaining a content (or a program) is output from the client device 2-1 to 2-*m* to the original server 3, a connection is established between the client device 2-1 to 2-*m* and the original server 3, so that the content is distributed (see 200 shown as a dotted line in FIG. 1).

On the other hand, the present invention is equipped with the IP router 1, and by using the IP router 1, a connection is established between the client device 2-1 to 2-*m* and the IP router 1 (see 201 in FIG. 1), and the IP router 1 obtains a URL (Uniform Resource Locator) from the client device 2-1 to 2-*m*.

The IP router 1 confirms whether the mirror servers 4-1 to 4-*n* of the original server 3 corresponding to the URL obtained from the client device 2-1 to 2-*m* exist. If the mirror servers 4-1 to 4-*n* exist, the IP router 1 selects the optimum server based on an index such as throughput, among the mirror servers 4-1 to 4-*n*, and connects with it (see 202 shown as a solid line in FIG. 1).

The IP router 1 obtains the content from the mirror server 4-1 to 4-*n* with which it connects (see 203 shown as a broken line in FIG. 1), and transfers the content to the client device 2-1 to 2-*m* (see 204 shown as a broken line in FIG. 1).

Figure 2:
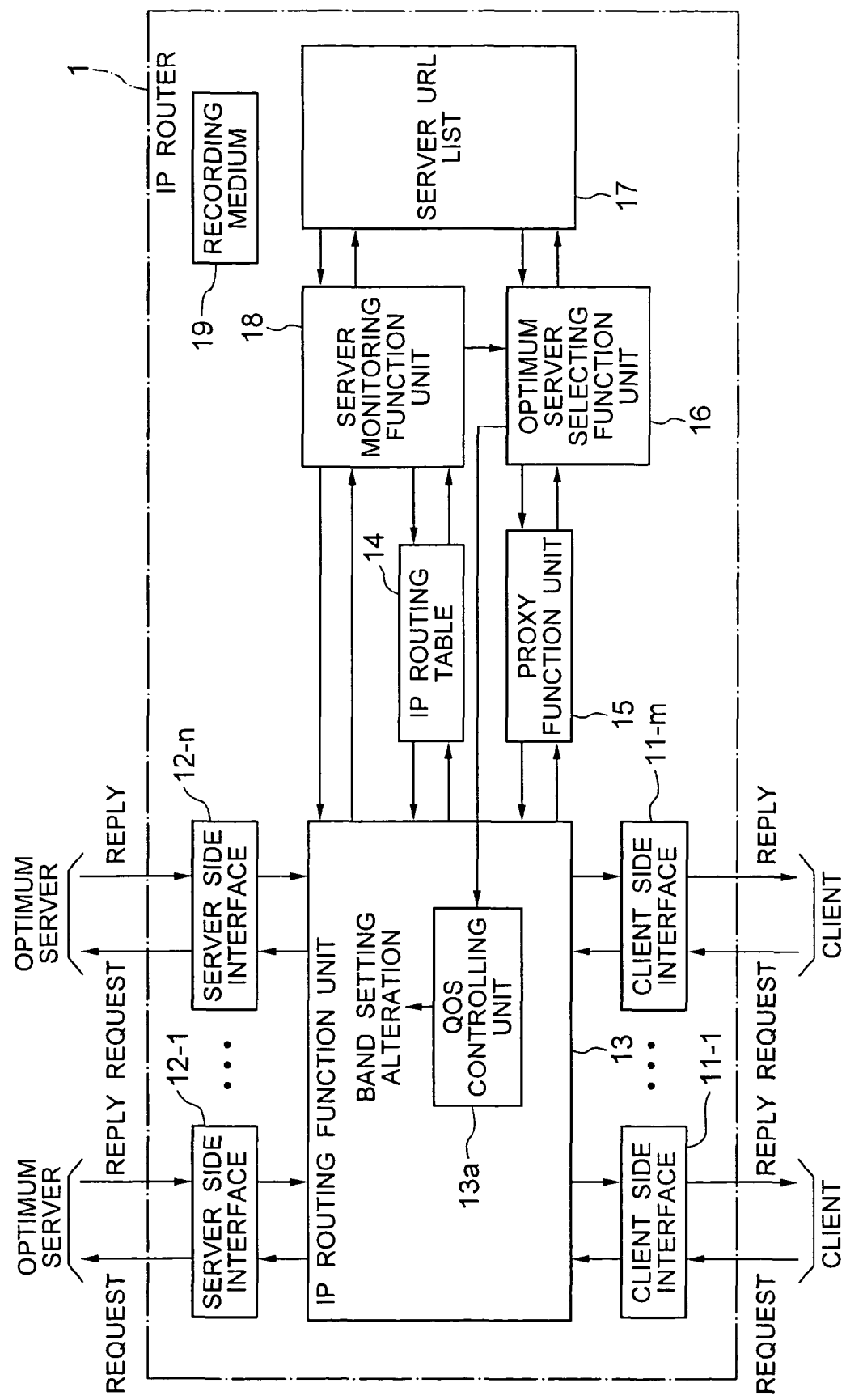
FIG. 2 is a block diagram showing the structure of an IP router according to the first embodiment of the present invention.

FIG. 2 is a block diagram showing the structure of the IP router 1 in FIG. 1. In FIG. 2, the IP router 1 includes: client side interfaces (IF) 11-1 to 11-*m*, server side interfaces (IF) 12-1 to 12-*n*, an IP routing function unit 13, an IP routing table 14, a proxy function unit 15, an optimum server selecting function unit 16, a server URL list 17, a server monitoring function unit 18, and a recording medium 19.

The client side interfaces 11-1 to 11-*m* connect with the client devices 2-1 to 2-*m* and take charge of transmission/reception of data between the client devices 2-1 to 2-*m* and themselves. The server side interfaces 12-1 to 12-*n* connect with the original server 3 and the mirror servers 4-1 to 4-*n* (the network 100) and take charge of transmission/reception of data among the original server 3, the mirror servers 4-1 to 4-*n* and themselves.

The IP routing function unit 13 is provided with an IP routing function of a received packet, a function of redirecting packets for a specific port number set by an operator, and a QoS (Quality of Service) controlling unit 13*a* for controlling a band setting for each service class or the like. The IP routing table 14 stored information for IP routing.

The proxy function unit 15 ends connection from the client devices 2-1 to 2-*m*, and obtains URLs from the client devices 2-1 to 2-*m*. Then, based on the obtained URLs, the proxy function unit 15 connects with the optimum server as a substitute for the client devices 2-1 to 2-*m*. Then, the proxy function unit 15 obtains the content requested from the client devices 2-1 to 2-*m* from the optimum server, and transfers it to the client devices 2-1 to 2-*m*.

The optimum server selecting function unit 16 confirms whether the mirror servers 4-1 to 4-*n* of a server (the original server 3) corresponding to the URL informed by the proxy function unit 15 exist. If the corresponding mirror servers exist, the optimum server selecting function unit 16 selects the optimum sever based on an index such as an RTT (Round-Trip Time), among the servers.

The server URL list 17 stores data for a list of the original server 3 and the mirror servers 4-1 to 4-*n* retaining positioning information of the content shown by the URL obtained from a file and a DNS (Domain Name System) server (not shown) in the device.

The server monitoring function unit 18 obtains information, for example, about a health check for the original server 3 and the respective mirror servers 4-1 to 4-*n*, and load information of the original server 3 and the respective mirror servers 4-1 to 4-*n*, registered in the server URL list 17. Then, the server monitoring function unit 18 provides the obtained information (information about running/stopping state, RTT (Round-Trip Time), throughput, or the like) to the optimum server selecting function unit 16.

The recording medium 19 stores programs for realizing respective operations described above. The programs is executable on a computer (not shown) which is a main component of the IP router 1.

Here, the IP router 1 is the one integrating: an IP router formed of the client side interfaces 11-1 to 11-*m*, the server side interfaces 12-1 to 12-*n*, the IP routing function unit 13, and an IP routing table 14; and an optimum server selecting device formed of the proxy function unit 15, the optimum server selecting function unit 16, the server URL list 17, and the server monitoring function unit 18.

In the IP router 1 according to the present invention, the IP routing function unit 13 and the proxy function unit 15 are connected to thereby achieve a function equivalent to the case that the conventional IP router and the optimum server selecting device are connected so as to transfer data packets. Here, methods for connecting the IP routing function unit 13 and the proxy function unit 15 include, a connecting method of using a data bus, equivalent to the case that the IP router and the optimum server selecting device are connected via the client side interface 11-1 to 11-m or the server side interface 12-1 to 12-n. Further, as the connecting method, there may be one simplifying a part of packet data (a header part or the like), or one connecting with a use of an inner data bus in which speeding-up is realized by transferring packet data in parallel or the like.

Further, in the IP router 1, by connecting the IP routing table 14 and the server monitoring function unit 18, the server monitoring function unit 18 is capable of referring to route information and a routing metric [values of: band-width, communication cost, delay, pop-count, load, MTU (Maximum Transmission Unit), path cost, reliability and the like] as the contents of the IP routing table 14.

As for a structure which enables the server monitoring function unit 18 to refer to the contents of the IP routing table 14, the following structure may be considered. That is, a first method is that the IP routing table 14 is caused to be stored in a dual port memory, and the dual port memory is connected with the IP routing function unit 13 and the server monitoring function unit 18 over a data bus, to thereby make it possible to access from the server monitoring function unit 18 to the IP routing table 14. Another method is, for example, the IP routing function unit 13 and a memory accessible from the server monitoring function unit 18 are connected over a data bus, and by regularly writing latest information of the IP routing table 14 in the memory and making an access from the server monitoring function unit 18 to the memory, the latest information of the IP routing table 14 can be referred to.

Further, in the IP router 1, the IP routing function unit 13 and the server monitoring function unit 18 are connected to thereby realizing the equivalent function as that in the case of the conventional IP router and the optimum server selecting device being connected to thereby transfer IP packets. Here, methods for connecting the IP routing function unit 13 and the server monitoring function unit 18 include, a connecting method with a use of a data bus equivalent to the case that the IP router and the optimum server selecting device are connected via the client side interface 11-1 to 11-m or the server side interface 12-1 to 12-n. Further, as another connecting method, there may be one simplifying a part of packet data (a header part or the like), or one connecting with a use of an inner data bus in which speeding-up is realized by transferring packet data in parallel or the like.

Figure 3:
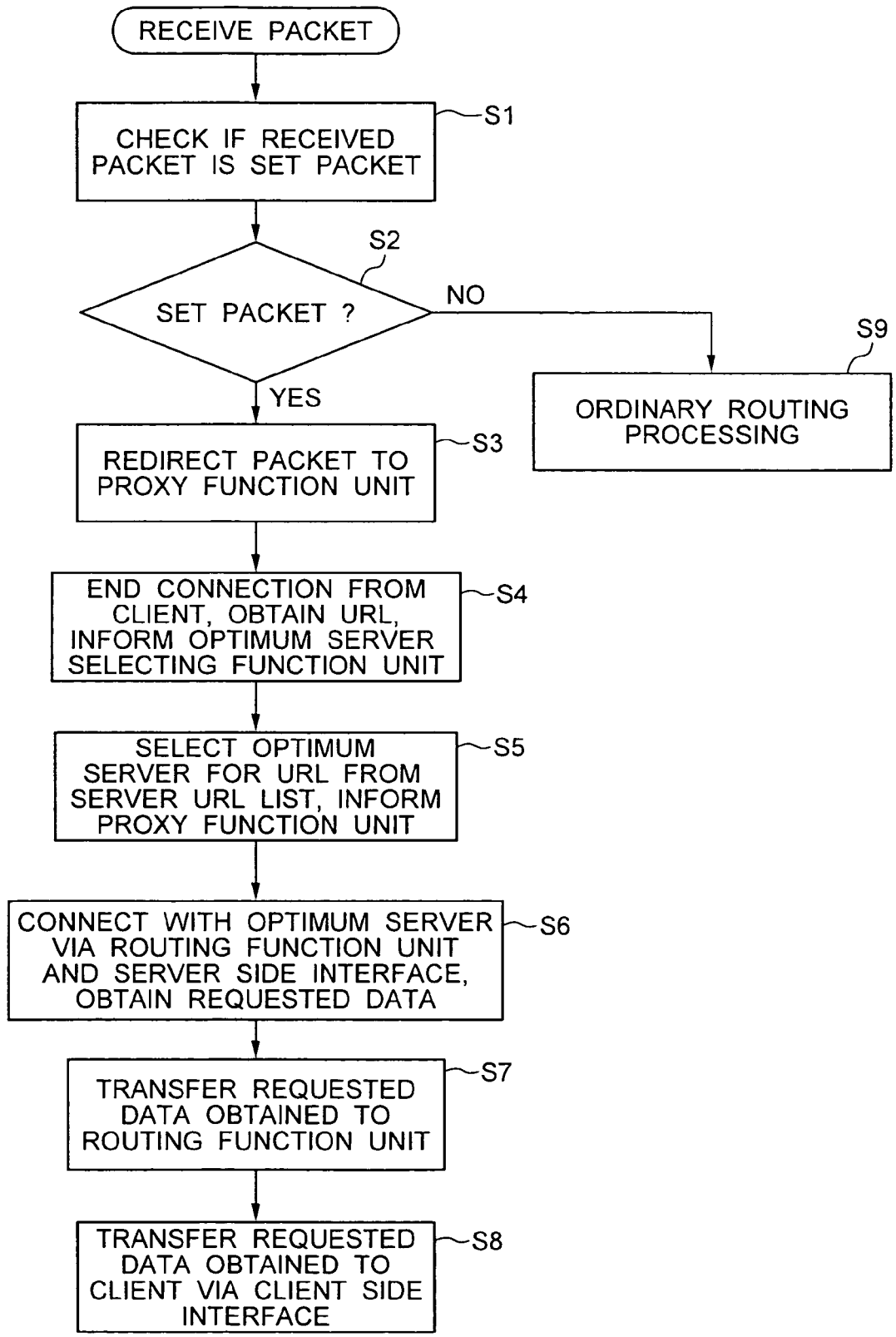
FIG. 3 is a flowchart showing an operation of the IP router in a case that a data distribution request is transmitted from a client device to the original server in FIG. 1.

FIG. 3 is a flowchart showing an operation of the IP router 1 in a case that a data distribution request is transmitted from the client device 2-1 to 2-m to the original server 3 in FIG. 1.

Referring to FIGS. 1 to 3, the operation in the case that a content distribution request is transmitted from the client device 2-1 to 2-m connecting with the IP router 1, to the original server 3 arranged to connect with the IP router 1 over the network 100. Note here that processing shown in FIG. 3 is realized by a computer of the IP router 1 executing a program in the recording medium 19.

When the content distribution request is transmitted from the client device 2-1 to 2-m connecting with the IP router 1 to the original server 3 arranged to connect with the IP router 1 over the network 100, the IP routing function unit 13 of the IP router 1 receives packets of the request data via the client side interface 11-1 to 11-m.

Here, the IP routing function unit 13 confirms whether the received packets correspond to packets [HTTP (Hyper Text Transfer Protocol) or the like] set by an operator (step S1 in FIG. 3). If they correspond (step S2 in FIG. 3), the IP routing function unit 13 redirects it to the proxy function unit 15 (step S3 in FIG. 3).

In the processing steps described above, the IP routing function unit 13, when receiving packets (HTTP or the like) set by the operator, redirects them to the proxy function unit 15. Further, the IP routing function unit 13, when receiving packets not set by the operator, only performs an ordinary IP routing processing with reference to the IP routing table 14 (steps S2 and S9 in FIG. 3).

The proxy function unit 15, when receiving the redirected packets from the IP routing function unit 13, ends the connection from the client device 2-1 to 2-m. Then, the proxy function unit 15 obtains a URL from the redirected packets, and informs it to the optimum server selecting function unit 16 (step S4 in FIG. 3).

The optimum server selecting function unit 16 receives the result of a health check, performed to respective servers (the original server 3 and the mirror servers 4-1 to 4-n), obtained from the server monitoring function unit 18. Then, based on the result of the health check, the optimum server selecting function unit 16 selects a server optimum for the URL received from the proxy function unit 15, among the server URL list 17. Then, the optimum server selecting function unit 16 informs the proxy function unit 15 of the selected optimum server (step S5 in FIG. 3).

The proxy function unit 15, based on the information informed by the optimum server selecting function unit 16, connects with the optimum server via the IP routing function unit 13 and the server side interfaces 12-1 to 12-n. Then, the proxy function unit 15 obtains from the connected optimum server the contents requested from the client device 2-1 to 2-m (step S6 in FIG. 3).

The proxy function unit 15 transfers the obtained content to the client device 2-1 to 2-m via the IP routing function unit 13 and the client side interface 11-1 to 11-m (steps S7, S8 in FIG. 3). With this process, the operation of the proxy function unit 15 ends.

Figure 4:
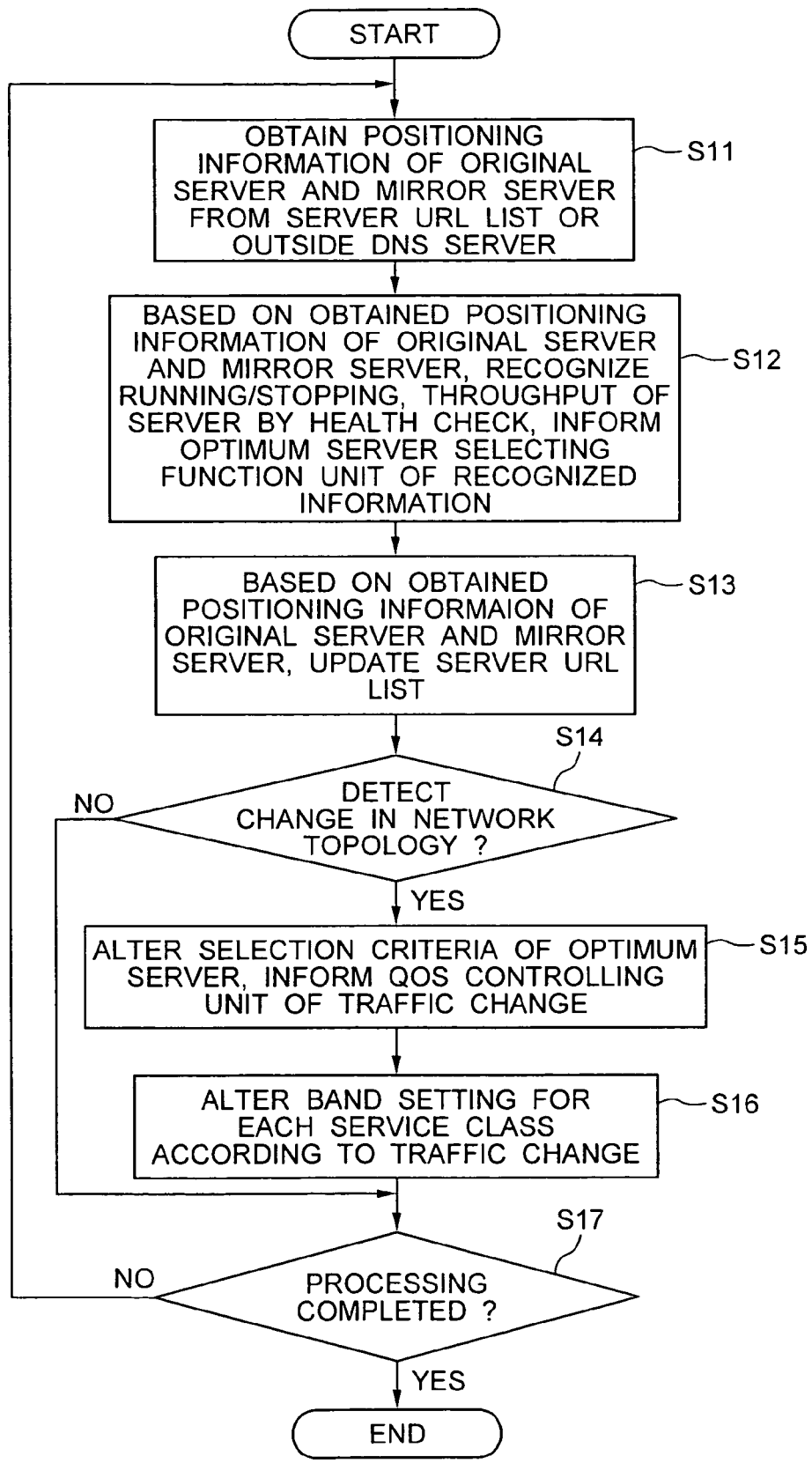
FIG. 4 is a flowchart showing an operation of an optimum server selecting function unit in FIG. 2 to select the optimum server based on a URL obtained from a proxy function unit, and a band setting operation of an IP routing function unit.

FIG. 4 is a flowchart showing an operation of the optimum server selecting function unit 16 in FIG. 2 selecting the optimum server based on the URL obtained from the proxy function unit 15 and a band setting operation of the IP routing function unit 13. Referring to FIGS. 1, 2 and 4, an operation of the optimum server selecting function unit 16 to select the optimum server based on the URL obtained from the proxy function unit 15, and a band setting operation of the IP routing function unit 13 accompanying thereto, will be explained.

Here, the optimum server selecting function unit 16 selects a server optimum for each URL based on information from the server monitoring function unit 18 and data of the server URL list 17. It should be noted that the processing shown in FIG. 4 is realized by the computer of the IP router 1 executing a program in the recording medium 19.

The server monitoring function unit 18 obtains positioning information of the original server 3 and the mirror servers 4-1 to 4-n from an outside DNS server or the like via the server URL list 17 or the IP routing function unit 13 and the server side interfaces 12-1 to 12-n (step S11 in FIG. 4).

Based on the obtained positioning information of the original server 3 and the mirror servers 4-1 to 4-n, the server monitoring function unit 18 recognizes the running/stopping state of each server, throughput, or the like through a health check and the like, and informs information thereof to the optimum server selecting function unit 16 (step S12 in FIG. 4). The server monitoring function unit 18 also updates data of the server URL list 17 based on the obtained positioning information of the original server 3 and the mirror servers 4-1 to 4-n (step S13 in FIG. 4).

Then, when the server monitoring function unit 18 detects, from a change in data of the IP routing table 14, a change in the network topology (step S14 in FIG. 4), the optimum server selecting function unit 16, upon receipt of output signals from the server monitoring function unit 18, alters the selection criteria of the optimum server. Further, the optimum server selecting function unit 16 informs the QoS controlling unit 13a of the traffic change (step S15 in FIG. 4). The QoS controlling unit 13a, when informed of the traffic change from the optimum server selecting function unit 16, alters the band setting for each service class corresponding to the traffic change (step S16 in FIG. 4).

The IP router 1 of the present invention makes it possible to select the optimum server under the latest conditions by repeating periodically the aforementioned operation (steps S11 to S17 in FIG. 4), a dynamic routing operation such as OSPF (Open Shortest Path First) and the like, even when any change occurs in the IP routing table 14.

With the aforementioned process, the IP router 1 of the present invention makes it possible to select the optimum server, following the dynamic change in the whole network. Further, the IP router 1 of the present invention is, even when any change occurs in the network topology, always capable of dispersing the load of the network and the server, and also capable of altering a required band for each route corresponding to the traffic change accompanying the alteration of the selection criteria of the optimum server according to the change in the network topology.

As such, in the present embodiment, the IP router 1 is provided with the optimum server selecting function unit 16, so that the optimum server selecting function unit 16 taking charge of selecting the optimum server can automatically recognize a change in the network topology from a change in the IP routing table 14 at real time.

With this structure, in the present embodiment, it is also possible to perform health checks, for obtaining information such as running/stopping state of each server, RTT, throughput and the like which serves as an index for selecting the optimum server, not regularly but only when a change in the IP routing table 14 is recognized.

Therefore, the present invention can suppress increase in the traffic caused by the health checks performed beyond the necessary frequency, and can select the optimum server following a change in the network topology, and also realize load dispersion of the network and the server. The required band for each route can be altered corresponding to the traffic change accompanying the alteration of the selection criteria of the optimum server according to the change in the network topology. Therefore, in the present embodiment, the band setting can be altered in a dynamic manner, so that a routing processing, corresponding to the traffic change accompanying the alteration of the selection criteria of the optimum server according to the change in the network topology, can be performed immediately.

Further, in the present embodiment, the function of the router and the optimum server selecting function are realized in a single device. Therefore, it is possible to realize an improvement in transmission efficiency, a higher performance due to a decrease in the transmission loss, miniaturization as a whole, and the lower cost in total, comparing with the case that the router and the optimum server selecting device of the conventional technique are combined so as to realize the similar function.

Figure 5:
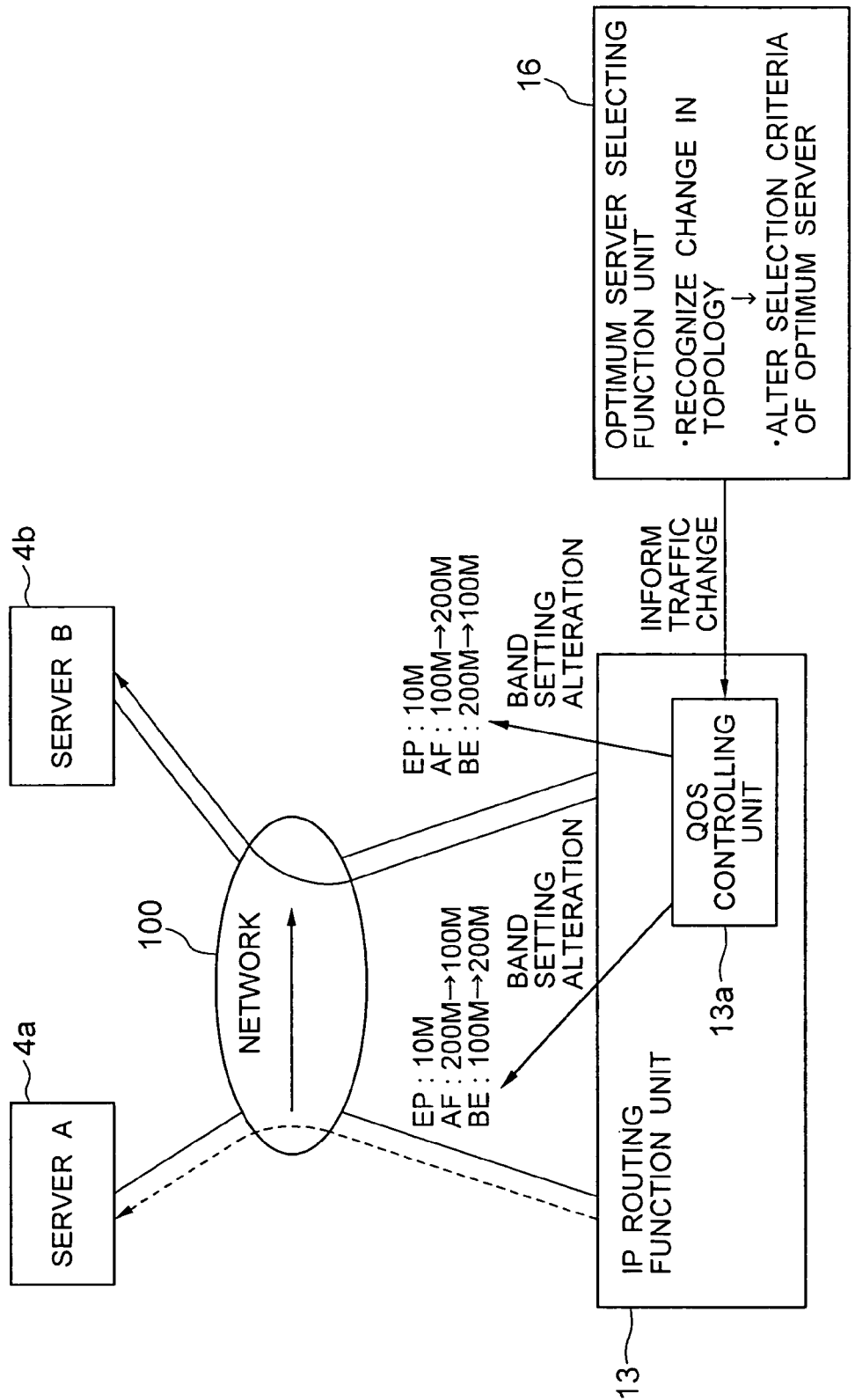
FIG. 5 is a diagram showing an example of an alteration of a band setting by a QoS controlling unit.

FIG. 5 is a diagram showing an example of changing a band setting by the QoS controlling unit 13a in FIG. 2. Referring to FIGS. 2 and 5, the operation of changing a band setting by the QoS controlling unit 13a will be described. Although, in the FIG. 5, servers 4a, 4b correspond to the mirror servers 4-1 to 4-n of FIG. 1, the original server 3 is also applicable.

As described above, the optimum server selecting function unit 16 receives signals output from the server monitoring function unit 18 upon recognition of a change in the network topology, alters the selection criteria of the optimum server, and informs a traffic change to the QoS controlling unit 13a. The QoS controlling unit 13a, corresponding to the information about the traffic change, alters band settings of routes to the server (A) 4a and to the server (B) 4b.

In FIG. 5, the band setting of the route to the server (A) 4a is altered from "EP:10M", "AF:200M" and "BE:100M" to "EP:10M", "AF:100M" and "BE:200M". The band setting of the route to the server (B) 4b is altered from "EP:10M", "AF:100M" and "BE:200M" to "EP:10M", "AF:200M" and "BE:100M".

Here, an explanation will be given for how the server monitoring function unit 18 delivers a change in the network topology from a change in the IP routing table 14.

When any change occurs in the network topology, routing information and routing metric (values of: band width, communication cost, delay, pop count, load, MTU, path cost, reliability and the like) as contents of the IP routing table 14, are rewritten by the function of dynamic routing of the IP router. Also in the static routing, similar effects can be predicted when rewritten by an input.

At this time, the server monitoring function unit 18 recognizes at real time the change in the contents of the IP routing table 14 by referring to the contents of the IP routing table 14. Methods that the server monitoring function unit 18 refers to the contents of the IP routing table 14 include, a method of the server monitoring function unit 18 polling the contents of the IP routing table 14, a method that a function of outputting an interruption to the server monitoring function unit 18 when the contents of the IP routing table 14 are changed (rewritten) is provided, or the like.

When recognizing a change in the contents of the IP routing table 14, the server monitoring function unit 18 confirms whether the change affects accesses to the server having mirror servers, by referring to the URL of the server written in the server URL list 17 and positioning information of the IP address or the like. If the server monitoring function unit 18 determines that the change affects the accesses, it confirms the RTT by performing a health check to each server and reconsiders the selection criteria of the optimum server.

As methods of selecting the optimum server, besides a method of measuring the RTT of each server by performing a health check, there is a method of altering an index for the selection corresponding to the type of the content. In this case, the indexes include a routing metric of the aforementioned IP routing table 14 (values of: band width, communication cost, delay, pop count, load, MTU, path cost, reliability and the like).

Here, as method enabling communications between the optimum server selecting function unit 16 and the QoS controlling unit 13a, there are a method of directly connecting the optimum server selecting function unit 16 and the QoS controlling unit 13a over the data bus (serial or parallel), and a method of performing communications over data buses existing between the IP routing function unit 13 and the proxy function unit 15, and between the proxy function unit 15 and the optimum server selecting function unit 16, respectively.

With this structure, the optimum server selecting function unit 16 recognizes a change in the network topology. When the selection criteria of the optimum server is altered, the optimum server selecting function unit 16 informs the QoS controlling unit 13a of alteration information of the route through which the traffic flows. The QoS controlling unit 13a, when the traffic change is informed, alters the band setting for each service class according to the traffic change.

As described above, the QoS controlling unit 13*a* changes the band setting for each service class based on the alteration information of the route through which the traffic flows. Accordingly, when the balance between the traffic change and the band set is disrupted, it is possible to change the band setting for the route, so that the network can be effectively utilized.

Figure 6:
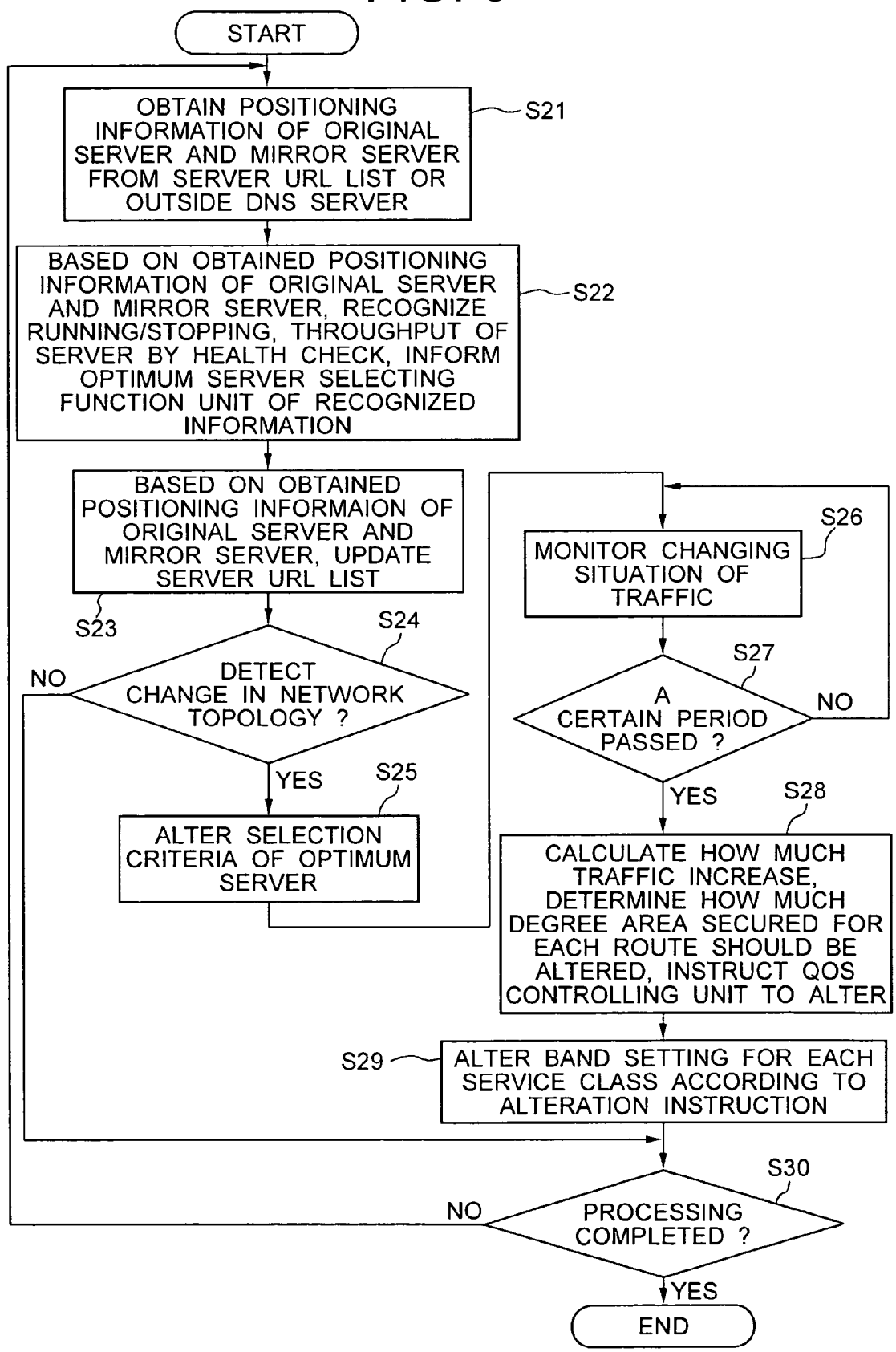
FIG. 6 is a flowchart showing an operation of an optimum server selecting function unit to select the optimum server from a URL obtained from a proxy function unit, and a band setting operation of an IP routing function unit, according to a second embodiment of the present invention.

FIG. 6 is a flowchart showing an operation that the optimum server selecting function unit selects the optimum server based on a URL obtained from the proxy function unit, and a band setting operation of the IP routing function unit, according to a second embodiment of the present invention. The structures of the communication system and the IP router according to the second embodiment of the present invention are similar to that of the first embodiment of the present invention shown in FIGS. 1 and 2. Therefore, referring to FIGS. 1, 2 and 6, an operation that the optimum server selecting function unit 16 selects the optimum server based on a URL obtained from the proxy function unit 15, and a band setting operation of the IP routing function unit 13 accompanying thereto, according to the second embodiment of the present invention, will be described.

It should be noted that the processing shown in FIG. 6 is realized by the computer of the IP router 1 executing a program in the recording medium 19. Further, since the operation of steps S21 to S24 shown in FIG. 6 is similar to the operation of steps S11 to S14 shown in FIG. 4, the explanation is omitted.

When the server monitoring function unit 18 detects a change in the network topology from a change in the IP routing table 14 (step S24 in FIG. 6), the optimum server selecting function unit 16 alters the selection criteria of the optimum server (step S25 in FIG. 6).

Following the alteration of the selection criteria of the optimum server, the optimum server selecting function unit 16 monitors, for a certain period of time, the changing state of the traffic after the alteration (steps S26, S27 in FIG. 6), and calculates how much the traffic increases. Then, the optimum server selecting function unit 16 determines how much degree the area secured for each route should be altered, and according to the result of the determination, instructs the QoS controlling unit 13*a* to alter (step S28 in FIG. 6). The QoS controlling unit 13*a* alters the band setting for each service class according to the alteration instruction from the optimum server selecting function unit 16 (step S29 in FIG. 6).

In the IP router 1, it is possible to select the optimum server under the latest conditions by repeating the aforementioned operations periodically (steps S21 to S30 in FIG. 6) or by a dynamic routing operation such as OSPF or the like, even when any change occurs in the IP routing table 14.

As described above, the IP router 1 makes it possible to select the optimum server following the dynamic change in the whole network, and even when a change occurs in the network topology, it always enables to disperse the load of the network and the server and also alter the required band for each route corresponding to the traffic change accompanying the alteration of the selection criteria of the optimum server when the network topology is changed.

Figure 7:
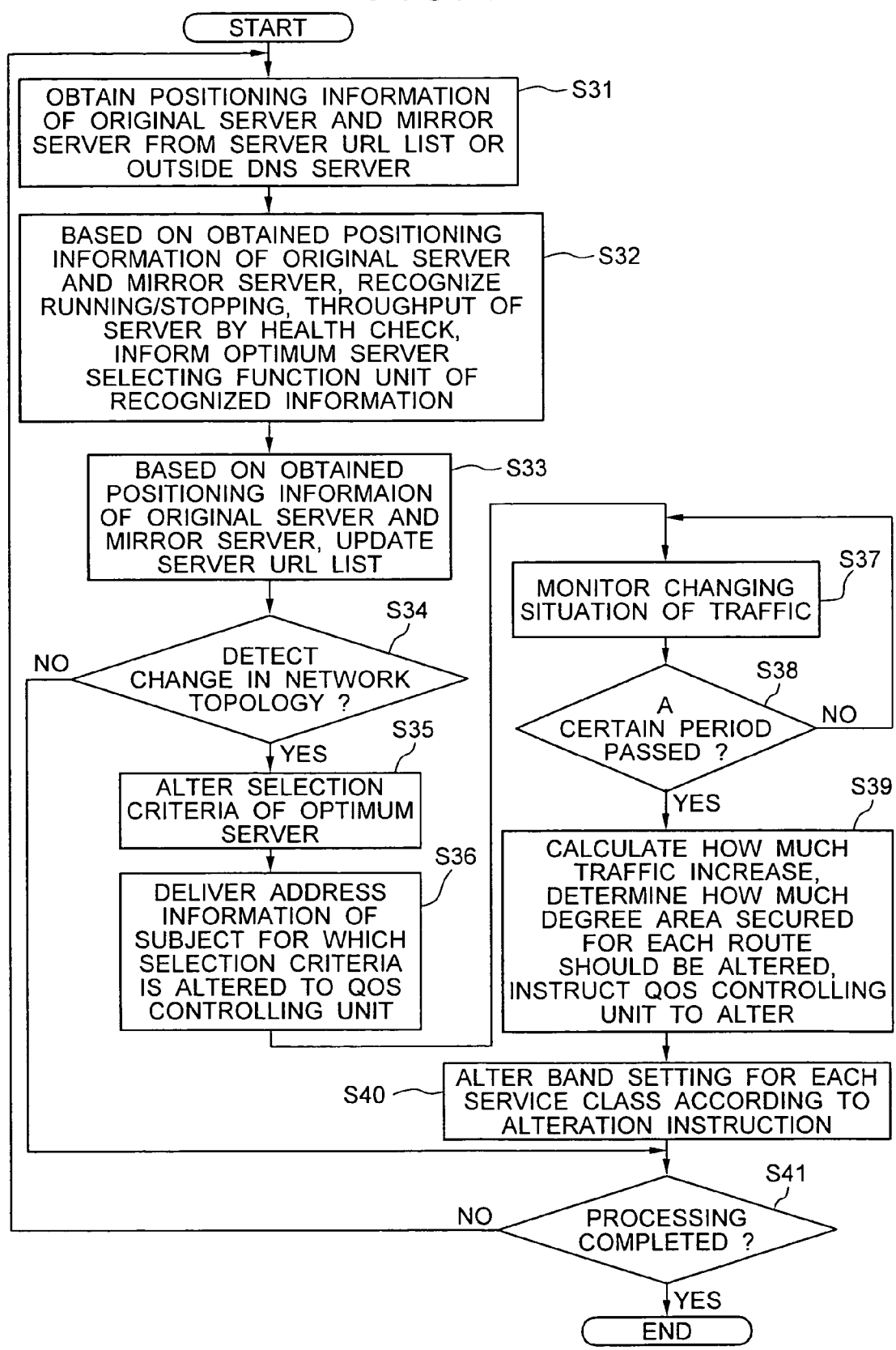
FIG. 7 is a flowchart showing an operation of an optimum server selecting function unit to select the optimum server from a URL obtained from a proxy function unit, and a band setting operation of an IP routing function unit, according to a third embodiment of the present invention.

FIG. 7 is a flowchart showing an operation that the optimum server selecting function unit selects the optimum server based on a URL obtained from the proxy function unit, and a band setting operation of the IP routing function unit, according to a third embodiment of the present invention. The structures of the communication system and the IP router according to the third embodiment of the present invention are similar to that of the first embodiment of the present invention shown in FIGS. 1 and 2. Therefore, referring to FIGS. 1, 2 and 7, an operation that the optimum server selecting function unit 16 selects the optimum server based on a URL obtained from the proxy function unit 15, and a band setting operation of the IP routing function unit 13 accompanying thereto, according to the third embodiment of the present invention, will be described.

It should be noted that the processing shown in FIG. 7 is realized by the computer of the IP router 1 executing a program in the recording medium 19. Further, since the operation of steps S31 to S34 shown in FIG. 7 is similar to the operation of steps S11 to S14 shown in FIG. 4, the explanation is omitted.

When the server monitoring function unit 18 detects a change in the network topology from a change in the IP routing table 14 (step S34 in FIG. 7), the optimum server selecting function unit 16 alters the selection criteria of the optimum server (step S35 in FIG. 7). Then, the optimum server selecting function unit 16 delivers address information of the altered subject, to the QoS controlling unit 13*a* (step S36 in FIG. 7).

The QoS controlling unit 13*a* monitors, for a certain period of time, the changing state of the traffic after the alteration of the selection criteria of the optimum server based on the address information delivered by the optimum server selecting function unit 16 (steps S37, S38 in FIG. 7). Then, the QoS controlling unit 13*a* calculates how much the traffic increases, and determines how much degree the area secured for each route should be changed (step S39 in FIG. 7). According to the result of the determination, the QoS controlling unit 13*a* alters the band setting for each service class (step S40 in FIG. 7).

In the IP router 1, it is possible to select the optimum server under the latest conditions by repeating the aforementioned operations periodically or by a dynamic routing operation such as OSPF or the like, even when any change occurs in the IP routing table 14.

As described above, the IP router 1 enables the selection of the optimum server following the dynamic changes in the whole network and even when a change occurs in the network topology, it always enables to disperse the load of the network and the server and also alter the required band for each route corresponding to the traffic change accompanying the alteration of the selection criteria of the optimum server when the network topology is changed.

Figure 8:
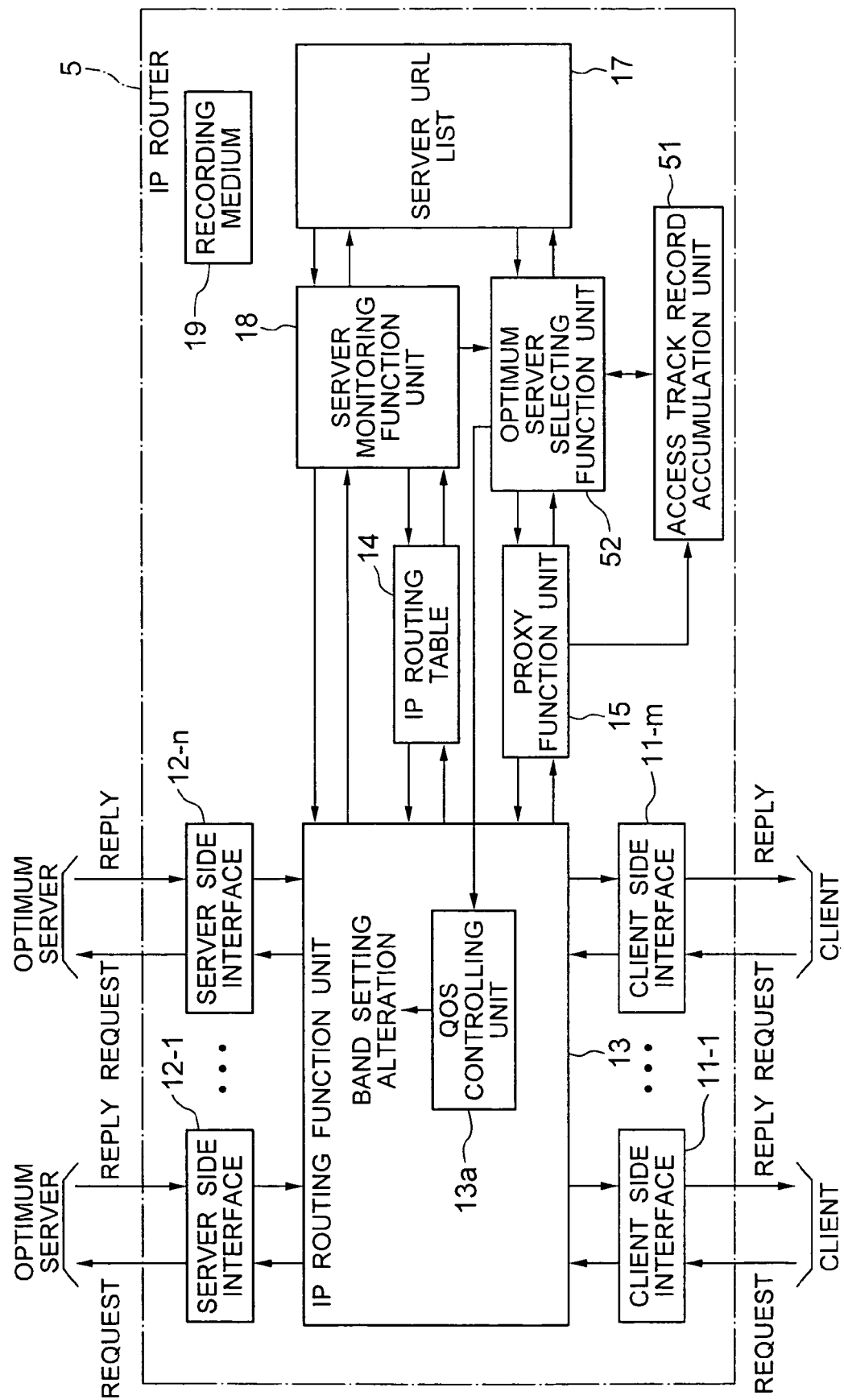
FIG. 8 is a block diagram showing the structure of an IP router according to a fourth embodiment of the present invention.

FIG. 8 is a block diagram showing the structure of the IP router according to a fourth embodiment of the present invention. In FIG. 8, the IP router 5 according to the fourth embodiment of the present invention has the similar structure to that of the first embodiment of the present invention shown in FIG. 2, except that an access track record accumulation unit 51 is added and an optimum server selecting function unit 52 is provided substituting the optimum server selecting function unit 16. The same components are indicated with the same reference numerals. Further, the operations of the same components are similar to that of the first embodiment of the present invention.

The access track record accumulation unit 51 accumulates throughput information of past access track record, or the like, by the proxy function unit 15. The optimum server selecting function unit 52 selects the optimum server by adding the information accumulated in the access track record accumulation unit 51 to the determination criteria when selecting the optimum server.

The first embodiment of the present invention only mentions that by realizing the router function and the optimum server selecting function in a single device, a change in the network topology is recognized from a change in the IP routing table 14, and by using it as a trigger, the state of the server is monitored. On the other hand, the present embodiment has a function of analyzing and accumulating throughput information of past access track record, so that it is capable of realizing the optimum server selection in a more efficient manner.

Figure 9:
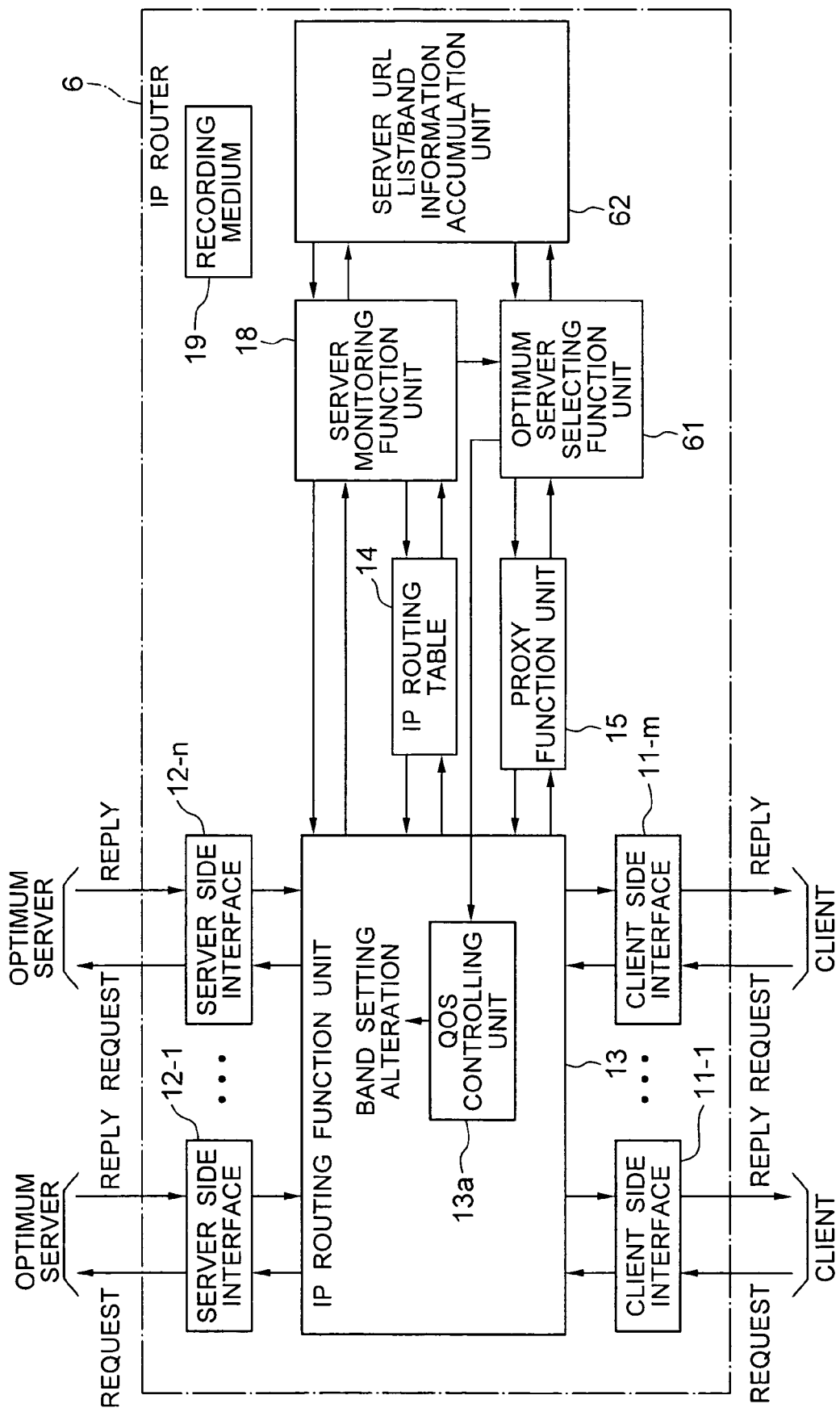
FIG. 9 is a block diagram showing the structure of an IP router according to a fifth embodiment of the present invention.

FIG. 9 is a block diagram showing the structure of the IP router according to a fifth embodiment of the present invention. In FIG. 9, an IP router 6 according to the fifth embodiment of the present invention has a similar structure to that of the first embodiment of the present invention shown in FIG. 2, except that an optimum server selecting function unit 61 is provided substituting the optimum server selecting function unit 16, and a server URL list/band information accumulation unit 62 is provided substituting the server URL list 17. The same components are indicated with the same reference numerals. Further, the operations of the same components are similar to that of the first embodiment of the present invention.

In the server URL list/band information accumulation unit 62, band information about each of the original server 3 and the mirror servers 4-1 to 4-n is accumulated in addition to the server URL list. The optimum server selecting function unit 61 selects the optimum server while altering the selection criteria of the optimum server for each content based on the accumulated information in the server URL list/band information accumulation unit 62.

With this process, the present embodiment can realize selection of the optimum server and load dispersion of the network in a better manner. For example, in a case that a content, containing many pieces of data having small volume of 0.4 Kbyte to 7 Kbyte, is requested for distribution, the optimum server is selected using the RTT as an index. Further, in a case that a content, containing a piece of data having large volume of 500 Kbyte or more, is requested for distribution, since the band affects the throughput more than RTT, the optimum server is selected according to the band as an index.

(Effects)

As described above, in the present invention, the optimum server selecting function is provided to the IP router, and at the time that a change of the network topology is recognized from a change in the IP routing table of the IP router, the optimum server is selected based on the result of the recognition. Further, a band setting for each service class is altered corresponding to the traffic change accompanying the alteration of the conditions for selecting the optimum server.

Therefore, such an effect is achieved that band settings can be altered in a dynamic manner, and routing processing, corresponding to a traffic change accompanying an alteration of the selection criteria for the optimum server when the network topology is changed, can be performed immediately.

What is claimed is:

1. An Internet Protocol (IP) router including an IP routing table which stores routing information for connecting a plurality of client devices with an original server which is at least an origin of supplying a content and with a plurality of mirror servers into which the content supplied from the original server is copied, and an IP routing function which performs an IP routing of a received packet according to the IP routing table, the IP router comprising:
   means for ending a connection relating to a packet output from a specific port of a client device and obtaining request information of a content requested by the client device;
   means for confirming whether the plurality of mirror servers of the original server exists corresponding to the obtained request information;
   means for selecting, if the plurality of mirror servers exists, an optimum server, from among the mirror servers, for the request information based on information which is to be an index for selecting an optimum server and based on the routing information;
   means for obtaining the content by connecting with the selected optimum server;
   means for transferring the obtained content to the client device;
   means for detecting a change in a network topology based on a change in the IP routing table;
   means for altering a selection criteria of the optimum server only when the change in the network topology is detected; and
   means for altering a band setting for each service class according to a traffic change accompanying an alteration of the selection criteria.

2. The IP router, as claimed in claim 1, wherein the information to be an index for selecting the optimum server comprises at least one of: information for driving/stopping state per server, Round-Trip Time (RTT) information, or throughput information.

3. The IP router, as claimed in claim 1, wherein the means for selecting an optimum server selects the optimum server by additionally considering a past access track record.

4. The IP router, as claimed in claim 1, further comprising:
   means for detecting a change in the IP routing table and performing a health check for obtaining the index information per server based on the detected change in the IP routing table.

5. The IP router, as claimed in claim 1, further comprising:
   means for monitoring a changing situation of the traffic for a predetermined period of time, which monitoring means is triggered by the detected topology change, wherein the means for altering the band setting alters the band setting for each service class by using a result of monitoring the changing situation of the traffic.

6. A communication system comprising:
   a plurality of client devices;
   an original server which at least serves as an origin of supplying a content;
   a plurality of mirror servers which mirror servers copy and hold the content supplied from the original server; and
   an Internet Protocol (IP) router including an Internet protocol (IP) routing table which stores routing information for connecting the plurality of client servers with the original server and with the plurality of mirror servers via a network, and an IP routing function which performs an IP routing of a received packet according to the IP routing table, wherein the IP router includes:
   means for ending a connection relating to a packet output from a specific port of a client device and obtaining request information of a content requested by the client device;
   means for confirming whether the plurality of mirror servers of the original server exists corresponding to the obtained request information;
   means for selecting, if the plurality of mirror servers exists, an optimum server, from among the mirror servers, for the request information based on information which is to be an index for selecting an optimum server, and based on the routing information;
   means for obtaining the content by connecting with the optimum server selected;
   means for transferring the obtained content to the client device;

means for detecting a change in a network topology based on a change in the IP routing table;
means for altering a selection criteria of the optimum server only when the change in the network topology is detected; and
means for altering a band setting for each service class according to a traffic change accompanying an alteration of the selection criteria.

7. The communication system, as claimed in claim 6, wherein the index information which is to be an index for selecting an optimum server comprises at least one of: information for driving/stopping state per server, Round-Trip Time (RTT) information, or throughput information.

8. The communication system, as claimed in claim 6, wherein the means for selecting the optimum server selects the optimum server by additionally considering a historical access track record.

9. The communication system, as claimed in claim 6, wherein the IP router further comprises:
means for detecting a change in the IP routing table and performing a health check for obtaining the index information per server based on the detected change in the IP routing table.

10. The communication system, as claimed in claim 6, wherein the IP router further comprises:
means for monitoring a changing situation of the traffic for a predetermined period of time, wherein the means for altering the band setting alters the band setting for each service class according to a result of monitoring the changing situation of the traffic.

11. A band setting method of an Internet Protocol (IP) router including an IP routing table which stores routing information for connecting a plurality of client devices with an original server which at least serves as an origin of supplying a content and with a plurality of mirror servers, into which the content supplied from the original server is copied, and an IP routing function which performs an IP routing of a received packet according to the IP routing table, the band setting method comprising:
ending a connection relating to a packet output from a specific port of a client device, and obtaining request information of a content requested by the client device;
confirming whether the plurality of mirror servers of the original server exists corresponding to the obtained request information;
selecting, if the plurality of mirror servers exists, an optimum server, from among the mirror servers, for the request information based on information which is to be an index for selecting an optimum server and based on the routing information;
obtaining the content by connecting with the selected optimum server;
transferring the obtained content to the client device;
detecting a change in a network topology based on a change in the IP routing table;
altering a selection criteria of the optimum server only when the change in the network topology is detected; and
altering a band setting for each service class according to a traffic change accompanying an alteration of the selection criteria.

12. The band setting method, as claimed in claim 11, wherein the information to be an index for selecting an optimum server comprises at least one of: information for driving/stopping state per server, Round-Trip Time (RTT) information, or throughput information.

13. The band setting method, as claimed in claim 11, wherein selecting an optimum server comprises:
selecting the optimum server by additionally considering a historical access track record.

14. The band setting method, as claimed in claim 11, wherein a health check for obtaining information per server, which is to be an index for selecting the optimum server, is performed when a change in the IP routing table is recognized.

15. The band setting method, as claimed in claim 11, further comprising:
monitoring a changing situation of the traffic for a predetermined period of time, and
altering the band setting for each service class according to a result of monitoring the changing situation of the traffic.

16. A non-transitory computer readable storage medium storing software program for setting a band by an Internet Protocol (IP) router which sets a band when connecting a plurality of client devices with an original server which is at least an origin of supplying a content and with a plurality of mirror servers which copy and hold the content over a network based on routing information of an IP routing table provided in the IP router, which software program when executed by a computer of the IP router causes the computer to perform operations comprising:
ending a connection relating to a packet output from a specific port of the client device, and obtaining request information of a content requested by the client device;
confirming whether the plurality of mirror servers of the original server exists corresponding to the obtained request information;
selecting, if the plurality of mirror servers exists, an optimum server, from among the mirror servers, for the request information based on information which is to be an index for selecting an optimum server and based on the routing information;
obtaining the content by connecting with the selected optimum server;
transferring the obtained content to the client device;
detecting a change in a network topology based on a change in the IP routing table;
altering a selection criteria of the optimum server only when the change in the network topology is detected; and
altering a band setting for each service class according to a traffic change accompanying an alteration of the selection criteria.

17. A method comprising at least one of downloading software to a computer, which when executed by the computer causes the computer to perform operations comprising the method of claim 11, or providing software to download to a computer, which when executed by the computer causes the computer to perform operations comprising the method of claim 11.

18. The IP router, as claimed in claim 1, further comprising:
identifying means for identifying the mirror servers comprising the requested content based on the obtained request information; and
server monitoring means for obtaining a Round-Trip Time (RTT) information for the identified mirror servers and providing the obtained RRT information to the means for selecting the optimum server, which selects the optimum server based on the RTT information for the identified mirror servers.

* * * * *